United States Patent [19]
Hovey et al.

[11] Patent Number: 5,818,940
[45] Date of Patent: Oct. 6, 1998

[54] SWITCHING MATRIX

[75] Inventors: John M. Hovey, Washington, D.C.; Carlyle V. Parker, Alexandria, Va.

[73] Assignee: The United States of America as represented by The Secretary of the Navy, Washington, D.C.

[21] Appl. No.: 308,630

[22] Filed: Nov. 22, 1972

[51] Int. Cl.⁶ ........................................... H04L 9/06
[52] U.S. Cl. ................................. 380/50; 342/45; 380/28
[58] Field of Search ...................... 343/6.5 LC, 6.8 LC; 340/166 S, 166 SC, 168 S, 168 R; 380/28, 50; 342/45

[56] References Cited

U.S. PATENT DOCUMENTS

| | | | |
|---|---|---|---|
| 2,912,486 | 11/1959 | Shanahan | 340/166 R |
| 2,958,848 | 11/1960 | Garwin | 340/166 SC |
| 3,341,846 | 9/1967 | McMurren et al. | 343/6.8 LC |
| 3,364,468 | 1/1968 | Haibt et al. | 340/166 SC |
| 3,500,406 | 3/1970 | Parker | 343/6.8 LC |
| 3,538,497 | 11/1970 | Harmon | 340/166 R X |
| 3,576,569 | 4/1971 | Watson | 340/166 R |
| 3,680,050 | 7/1972 | Griffin | 340/168 S X |
| 3,680,090 | 7/1972 | Bishop | 343/6.5 LC |
| 3,715,750 | 2/1973 | Bishop | 343/6.8 LC |

*Primary Examiner*—Gilberto Barrón, Jr.
*Attorney, Agent, or Firm*—Thomas McDonnell; Charles J. Stockstill

[57] ABSTRACT

A deciphering unit having input and output matrices connected to a master shift register to permit flexible access to its stages. The output matrix allows selection of four register positions in the master shift register from which data is fed to a correspondence generator where it is partially descrambled. Subsequently, the input matrix allows selection of four input register positions for the partially descrambled data, and one input register position for serial key shift register data. A comparison matrix selects eight bit positions to allow comparison of the descrambled master shift register data with a predetermined eight bit word. Upon favorable comparison a four bit word is transmitted to a base interrogating station for identification. Also, the same apparatus can be used for enciphering by shifting the data in the master shift register in a reverse manner.

9 Claims, 6 Drawing Sheets

SWITCHING MATRIX

BACKGROUND OF THE INVENTION

The invention relates generally to IFF Mark XII Mode 4 radar identification deciphering units and more specifically to a manner of allowing more flexibility in access to the coded positions of its master shift register. The prior system, such as the KIR-1A/TSEC, contains fixed wiring taps between the master shift register, correspondence generator, and serial key shift register. The position of these taps contains information concerning one of the decipherment codes of the equipment. Knowledge of these positions through capture of the equipment or access to instruction booklets would allow possible decoding of the entire encipherment code. Thus the equipment and instruction booklets must be kept classified even when the key code is not set in the equipment. The equipment cannot be left unguarded in aircraft and must be removed to suitable locked containers. Installation and removal of equipment and classification of instruction booklets is a nuisance and is costly.

OBJECTS OF THE INVENTION

It is therefore the object of the present invention to avoid costly, time consuming security procedures pertaining to prior systems by producing a device having no classified information inherent in its structure.

Another object of the invention is to provide means for allowing flexible access to a master shift register and neutralization of the access positions when the equipment is not in use.

Other objects, advantages and novel features of the invention will become apparent from the following detailed description of the invention when considered in conjunction with the accompanying drawings.

SUMMARY OF THE INVENTION

The present invention avoids the drawbacks of the prior systems by providing three sets of matrices connected to a master shift register. Two of the matrices are connected to the output of the master shift register. One of them allows selection of any four of thirty-two register stages for input to a correspondence generator. The other selects any eight of the thirty-two outputs for comparison with a predetermined eight bit word. The third matrix is coupled to the input of the master shift register and allows selection of any four of its thirty-two register stages for the output of the correspondence generator. The third matrix also allows selection of any stage of the master shift register for the output of the serial key shift register. Choice of a register stage is made simply by selectively activating the switches of the matrices. This permits flexibility in selection of register stages and allows easy neutralization of the chosen positions.

DESCRIPTION OF THE PREFERRED EMBODIMENT

Figure 1:
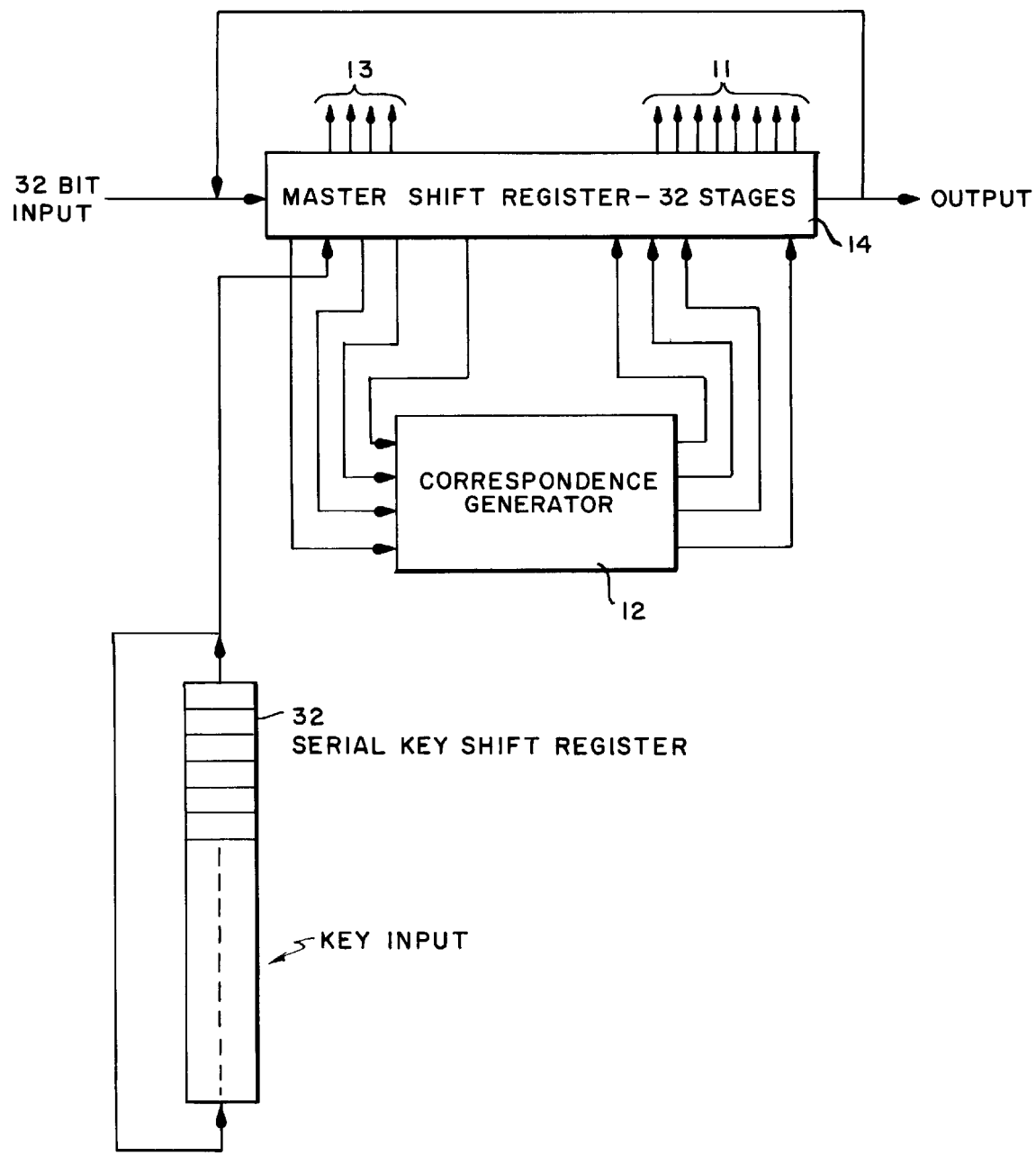
FIG. 1 shows a typical prior art system with fixed tap positions to the master shift register.

FIG. 1 shows a conventional deciphering unit for IFF Mark XII Mode 4 radar identification unit such as the KIT-1A/TSEC unit. The system receives a 32 bit binary scrambled word from a base interrogating unit and serially shifts this word into master shift register 14. Correspondence generator 12 receives data from the master shift register 14 through four wires connected at four fixed positions. After processing, the data is similarly fed back to the master shift register 14 at four different positions. A key word input from serial key shift register 32 is fed to the master shift register 14 at yet a different fixed position. The correspondence generator 12 descrambles the data of the master shift register 14 as it is shifted through the system and reinserts the descrambled data at different points in the register. The data from the serial key shift register 32 is added in modulo 2 with the data being shifted through the register. The 32 bit word is shifted through the master shift register 14 twice and the end result is a highly non-linear processing of the data. The data present in the master shift register after processing is then sampled at eight fixed positions 11, and compared with their intended results. If comparison is favorable, a reply is made to the base interrogating unit by selecting and transmitting four more bits shown at 13.

Figure 2:
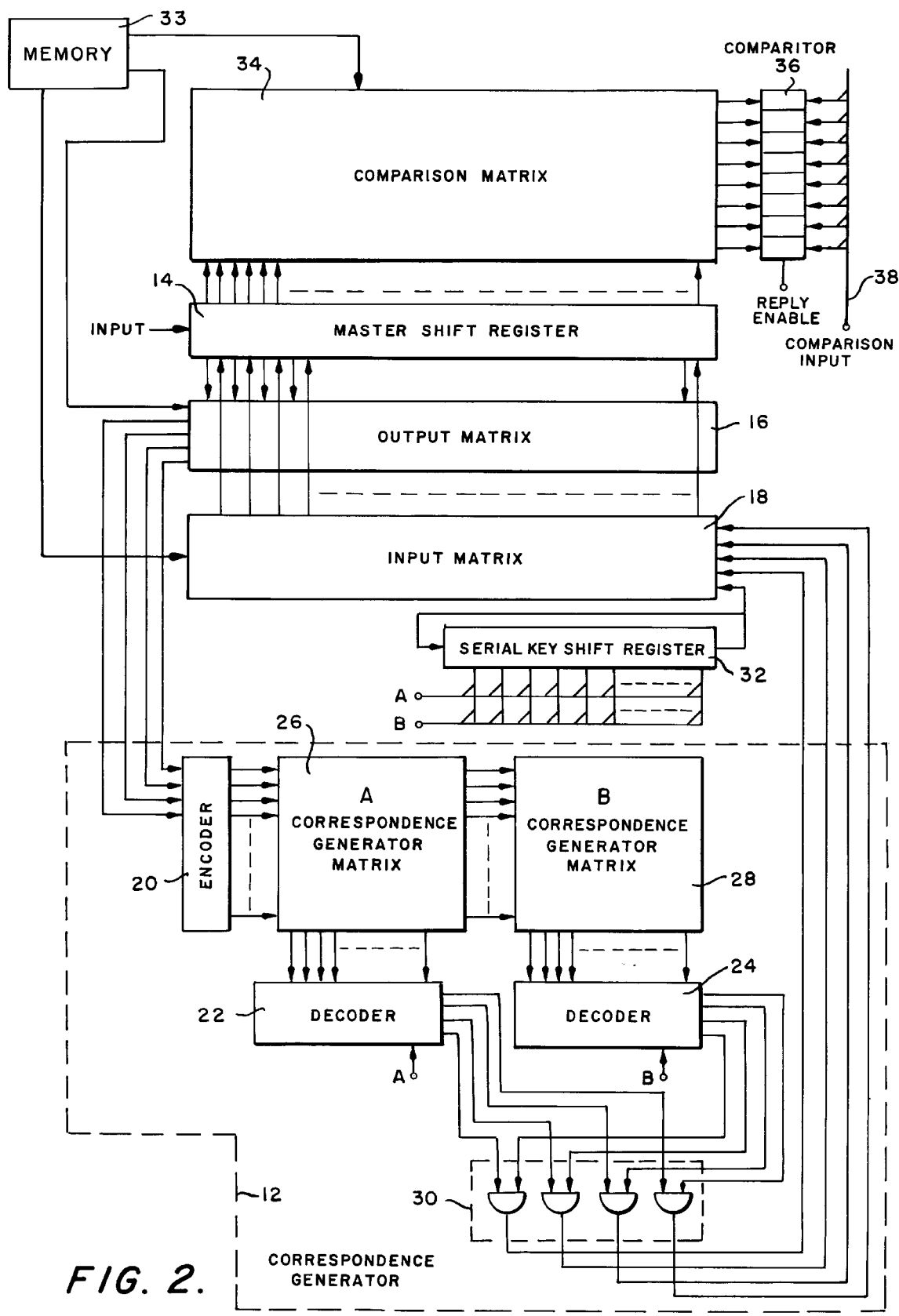
FIG. 2 is a block diagram of an embodiment of the invention, shown in more detail in FIGS. 5A, 5B and 5C.
Figure 5A:
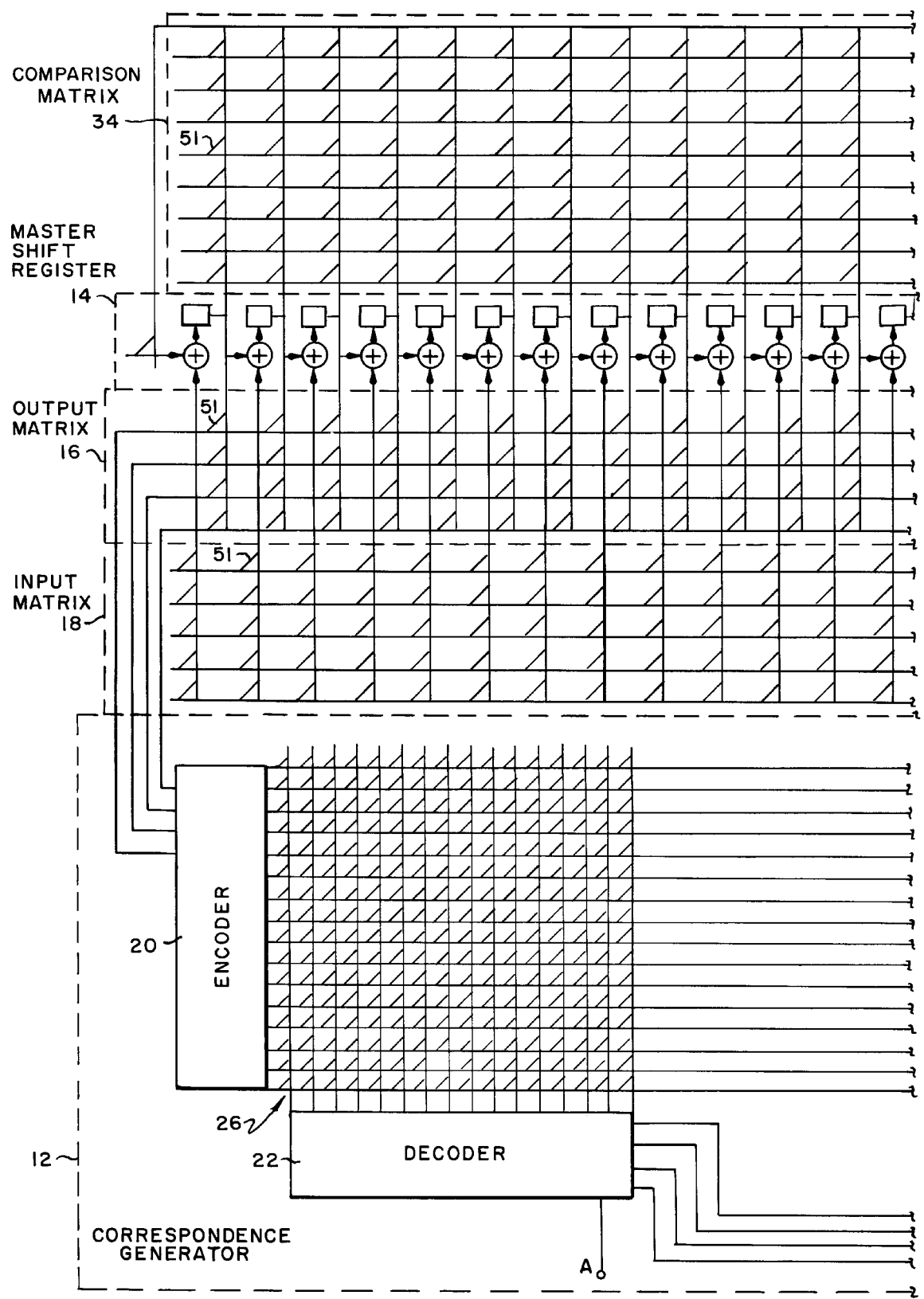
FIGS. 5A, 5B and 5C are a detailed showing of one embodiment of the invention.
Figure 5B:
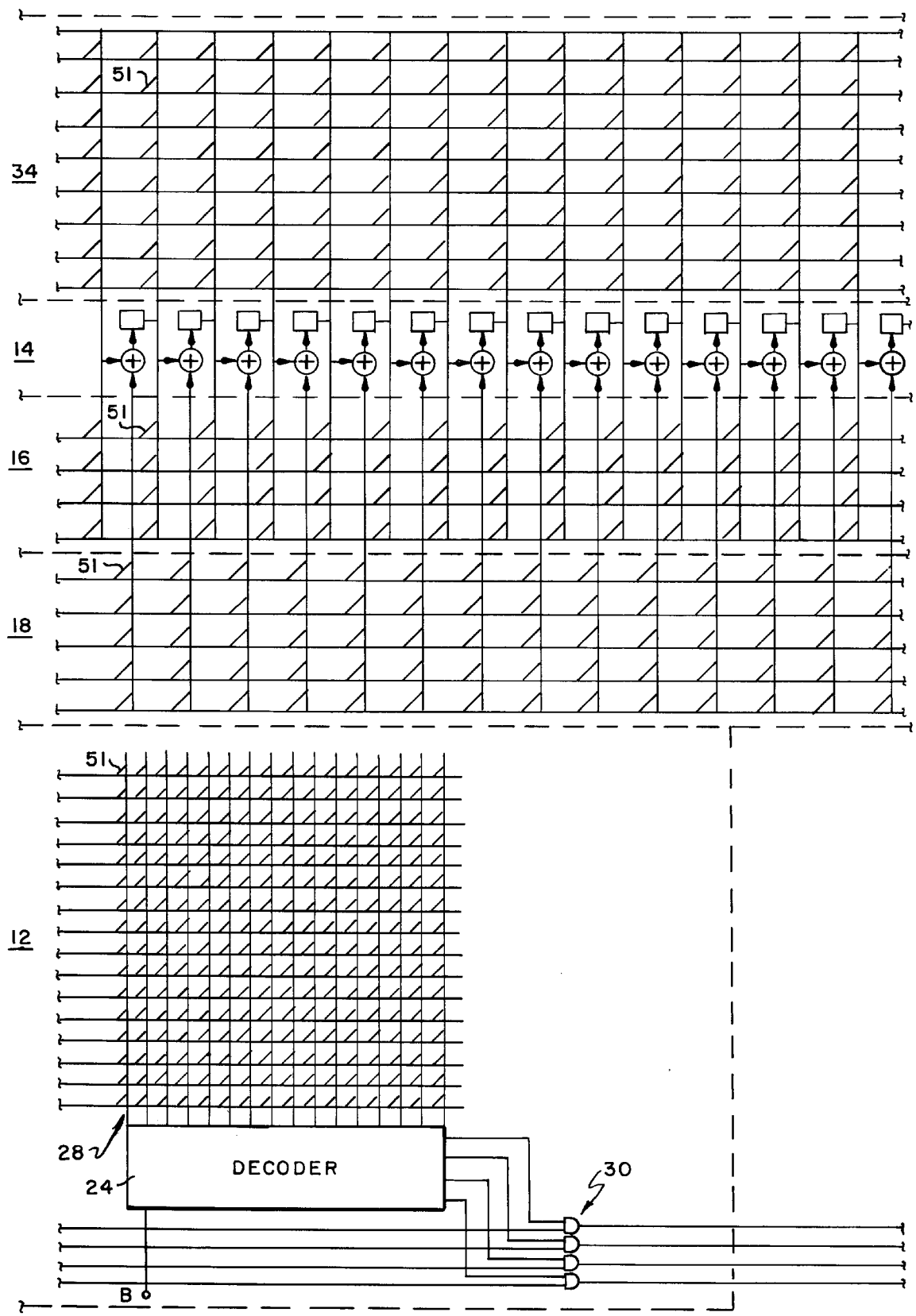
Figure 5C:
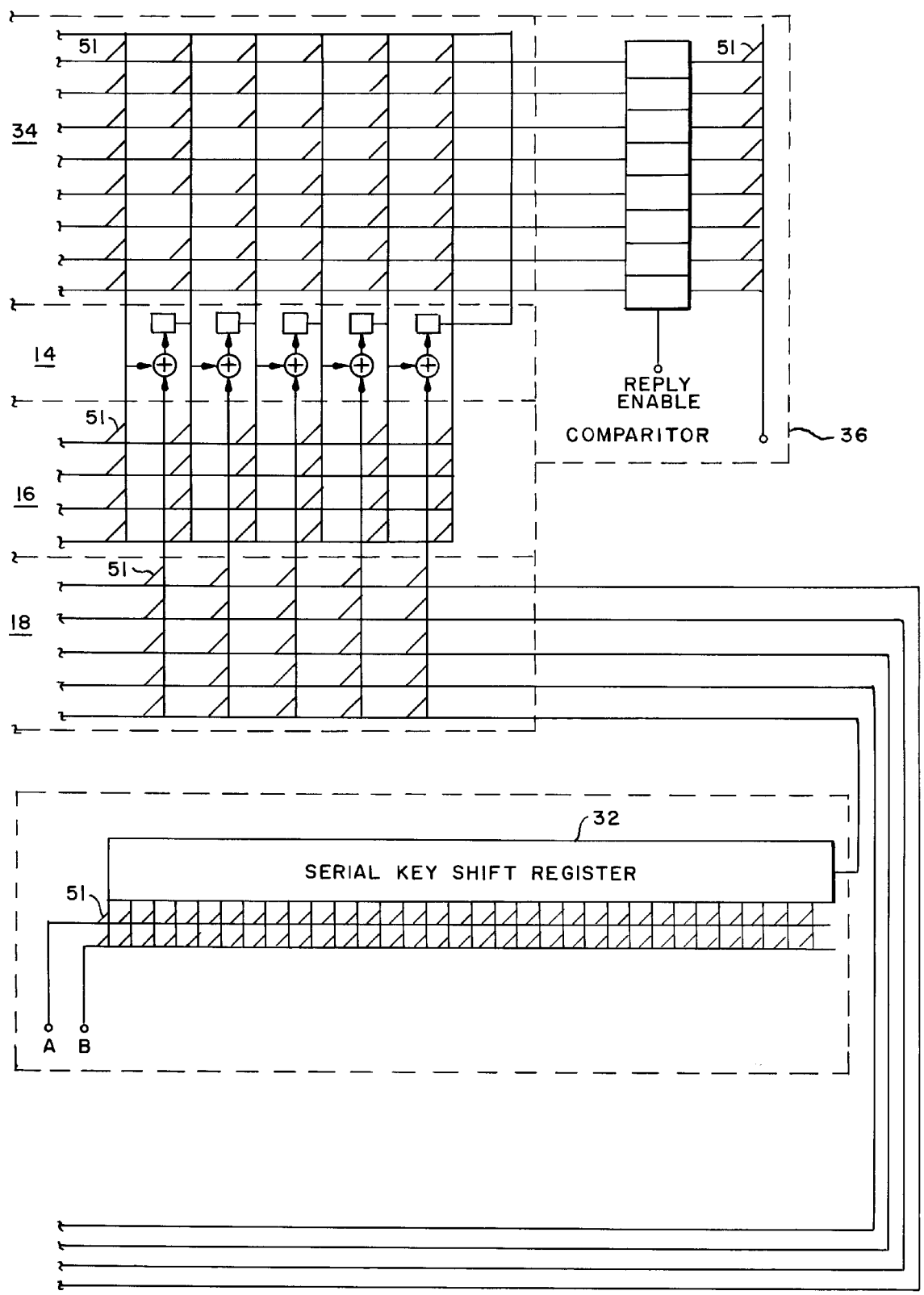

The function of the embodiment of the present invention, as shown in FIG. 2, is to provide circuitry for flexible access to the master shift register 14 which can be neutralized when not in use. This function is achieved by three matrices, the output matrix 16, the input matrix 18, and the comparison matrix 34. Output matrix 16 as seen in FIG. 5 consists of a matrix of switches which can be switched on or off as desired. Each of the thirty-two columns of the matrix is connected to the output of master shift register 14. Each of the four rows of the matrix is connected to the four inputs of the correspondence generator 12. Thus by closing any particular switch, any one of the four inputs to the correspondence generator 12 can be connected to any one of the outputs of the master shift register 14 thereby rendering the system completely flexible. Comparison matrix 34 operates in the same manner except that eight rows are present since eight bits must be compared initially as described previously and shown at 11, FIG. 1. Comparison is made by comparitor 36 which matches the register data from comparison matrix 34 with the input data from 38. Any four rows of comparison matrix 34 may be used for the subsequent selection of the four bits to be transmitted to the base interrogating unit. Input matrix 18 has thirty-two matrix columns each connected to an input of the master shift register. The four rows of input matrix 18 are connected to the four outputs of the correspondence generator 12. The fifth row is connected to the serial key shift register 32. Thus the five inputs to the master shift register, as shown in FIG. 1, are each represented by a row in matrix 18. Each row can be connected to any column (input to the master shift register) through selection of a switch, again giving complete flexibility. Not only is the system flexible, but it also can be neutralized by turning the switches off when not in use so as to contain no classified information relating to selected access positions.

Figure 3:
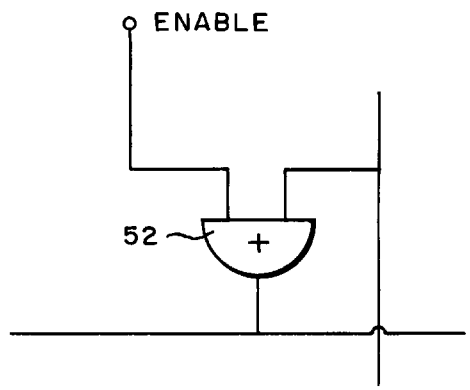
FIG. 3 is a diagram of one possible switch that might be used in matrices as shown in FIGS. 2, 5A, 5B and 5C.

The switches 51, as represented in FIG. 3, could comprise a register of single pole-single throw mechanical switches or a bank of "and gates" 52 with an enable input connected to a memory 33 or computer for selection. An example of a method for switch activation is shown in U.S. Pat. No. 3,201,764 issued Aug. 17, 1965 to C. V. Parker. However, any type of switching device used here would be acceptable.

Figure 4:
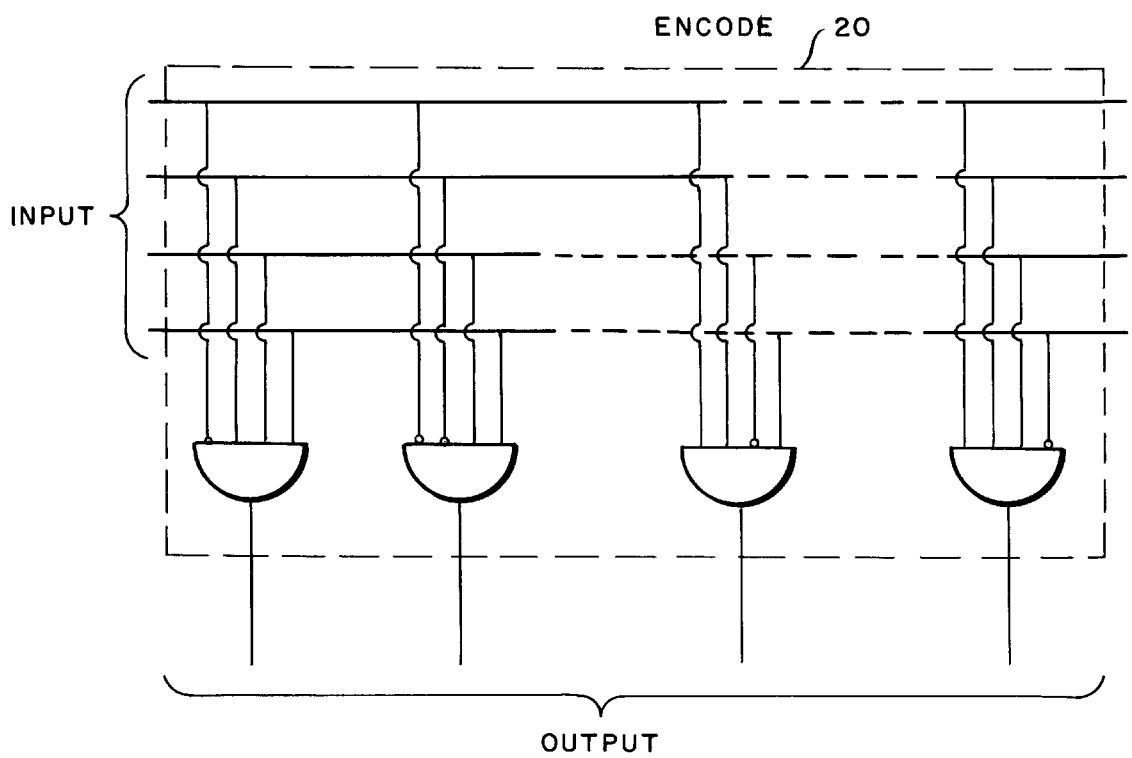
FIG. 4 shows an embodiment of an Encoder as shown in FIGS. 2 and 5A.

The correspondence generator as shown in FIG. 5 contains two matrices, 26 and 28, the inputs of which are connected to an encoder 20 and outputs each connected to decoders 22 and 24, respectively. Either of the two matrices can be used by selecting inputs A or B. The encoder 20 expands the data to sixteen possible outputs. An example of one suitable encoder is shown in FIG. 4. With four inputs the system could give sixteen possible outputs by varying the number and position of inverted and noninverted inputs to the gates. A similar device could be used for decoding. Inputs A and B select the particular matrix desired for the code of the day. "Or" gates 30 pass the selected data. Selection of switches in matrices 26 and 28 acts to further descramble the data between decoding and encoding. Selection can also be made at serial key shift register 32 of the A or B key word to be used for the day. The A and B key words are selected in the switches at the parallel input to the serial key shift register. Thus, the system basically operates in the following manner. An enciphered signal in the form of a 32 bit binary word is received and serially shifted into the master shift register 14. Four stages of the master shift register 14 are selected by output matrix 16 which feed the data in those four stages to a correspondence generator which further descrambles the data and reinserts this data back into the master shift register via input a matrix 18. After the data is cycled through twice (sixty four shifts), eight stages are selected for comparison of the data therein with predetermined data. If comparison is favorable a four bit word is selected and transmitted to the base interrogating station to indicate the target to be a friend.

The same apparatus could just as well be used for enciphering by merely shifting the data in the master shift register 14 from right to left instead of left to right as shown in FIGS. 2, 5A, 5B and 5C. This, in fact, is the process used by the KIR-1A/TSEC unit for enciphering the thirty-two bit binary word that is transmitted by the base interrogating unit.

Thus, the invention discloses apparatus which allows further flexibility in the coding of radar deciphering and enciphering units which in turn permits neutralization of the equipment so that they contain no secret data and can be declassified.

Obviously many modification and variations of the present invention are possible in light of the above teachings. It is therefore to be understood that within the scope of the appended claims the invention may be practiced otherwise than as specifically described.

What is claimed and desired to be secured by Letters Patent of the United States is:

1. A ciphering unit for processing coded signals comprising:
   master shift register means for receiving the coded signals at a first input terminal, said signals being directly applied as an input to no components of said ciphering unit other than said master shift register means;
   at least one first matrix means coupled to the output terminals of said master shift register means for selectively connecting said output terminals to output terminals of said first matrix means;
   second matrix means coupled to the input terminals of said master shift register means, other than said first input terminal, for selectively connecting said input terminals to the input terminals of said second matrix means; and
   signal processing means having input terminals coupled to output terminals of said first matrix means, and output terminals coupled to input terminals of said matrix means.

2. A ciphering unit for processing coded signals comprising:
   master shift register means for receiving the coded signals at a first input terminal, said signals being directly applied as an input to no components of said ciphering unit other than said master shift register means;
   at least one first matrix means coupled to the output terminals of said master shift register means for selectively connecting said output terminals to the output terminals of said first matrix means;
   second matrix means coupled to the input terminals of said master shift register means, other than said first input terminal, for selectively connecting said input terminals to the input terminals of said second matrix means;
   correspondence generator means connected to said first and second matrix means for converting data in said master shift register means; and
   serial key shift register means connected to said second matrix means for inserting data in said master shift register means.

3. The ciphering unit of claim 1 wherein said first and second matrix means comprise a register of mechanical single pole-single throw switch means.

4. The ciphering unit of claim 1 wherein said first and second matrix means comprise a register of solid state switching means.

5. The device of claim 4 further comprising memory means for selectively enabling said solid state switching devices.

6. The device of claim 1 wherein said first matrix means comprises:
   comparison matrix means for selecting certain stages of said master shift register means for comparison of the data in said stages with predetermined data;
   output matrix means for selecting certain stages of said master shift register means to be coupled to said correspondence generator means.

7. The device of claim 6 wherein said first and second matrix means comprise a register of solid state switching means.

8. The device of claim 7 further comprising a memory means for selectively enabling said solid state switching means.

9. A ciphering unit for processing coded signals comprising:
   an input signal storage means for receiving the coded signals at a first input terminal, the latter signals being directly applied as an input to no components of said ciphering unit other than said input signal storage means;
   at least one first matrix means coupled to the output terminals of said input signal storage means for selectively connecting said output terminals to output terminals of said first matrix means;
   second matrix means coupled to the input terminals of said input signal storage means, other than said first input terminal, for selectively connecting said input terminals to the input terminals of said second matrix means; and
   signal processing means having input terminals coupled to output terminals of said first matrix means, and output terminals coupled to input terminals of said second matrix means.

* * * * *